(12) United States Patent
Bernhard (10) Patent No.: US 8,845,255 B2
(45) Date of Patent: Sep. 30, 2014

(54) GUIDE APPARATUSES FOR USE WITH FASTENERS

(71) Applicant: Jordan CreativeWorks, LLC, Santa Monica, CA (US)

(72) Inventor: Jordan S. Bernhard, Santa Monica, CA (US)

(73) Assignee: Jordan CreativeWorks, LLC, Santa Monica, CA (US)

( * ) Notice: Subject to any disclaimer, the term of this patent is extended or adjusted under 35 U.S.C. 154(b) by 108 days.

(21) Appl. No.: 13/625,280

(22) Filed: Sep. 24, 2012

(65) Prior Publication Data

US 2013/0084143 A1    Apr. 4, 2013

Related U.S. Application Data

(60) Provisional application No. 61/540,611, filed on Sep. 29, 2011.

(51) Int. Cl.
*F16B 35/02*    (2006.01)
(52) U.S. Cl.
USPC .......................................... 411/383; 411/340
(58) Field of Classification Search
USPC ................. 411/386, 516, 548, 924, 999, 383

IPC ........................................................ F16B 41/00
See application file for complete search history.

(56) References Cited

U.S. PATENT DOCUMENTS

| | | | | |
|---|---|---|---|---|
| 1,993,391 A * | 3/1935 | Weaver, Jr. | ..................... | 439/779 |
| 2,105,129 A * | 1/1938 | Ridgers | .......................... | 439/779 |
| 2,389,344 A * | 11/1945 | Constance | .................... | 411/555 |
| 3,244,056 A * | 4/1966 | Kern et al. | ..................... | 411/340 |
| 3,473,431 A * | 10/1969 | King, Jr. | ....................... | 411/344 |
| 4,432,683 A * | 2/1984 | Polos | ............................ | 411/340 |
| 4,475,329 A * | 10/1984 | Fischer | ........................... | 52/704 |
| 4,971,502 A * | 11/1990 | Oh | ................................ | 411/340 |
| 5,044,854 A | 9/1991 | Oh | | |
| 5,110,243 A | 5/1992 | Oh | | |
| 5,197,839 A | 3/1993 | Willey et al. | | |
| 5,967,725 A * | 10/1999 | Voges | ........................... | 411/386 |
| 6,672,547 B1 | 1/2004 | Westerberg et al. | | |
| 7,726,926 B2 * | 6/2010 | Lemire | .......................... | 411/340 |

* cited by examiner

Primary Examiner — Gary Estremsky
(74) Attorney, Agent, or Firm — K&L Gates LLP (57) ABSTRACT

A variety of fasteners and guide assembly devices are disclosed. The fasteners in various forms include a guide member that protrudes from the fastener to facilitate guiding of the fastener into a hole, passage, opening, etc. or corresponding fastener component such as a nut. The guide member may be substantially rigid or substantially flexible. The guide member may be permanently or temporarily attached to the fastener.

13 Claims, 9 Drawing Sheets

GUIDE APPARATUSES FOR USE WITH FASTENERS

CROSS-REFERENCE TO RELATED APPLICATIONS

The present application claims the benefit of U.S. Provisional Patent Application No. 61/540,611, filed Sep. 29, 2011, entitled "Fasteners With Guide Apparatus", the entire disclosure of which is hereby incorporated by reference.

FIELD OF THE INVENTION

The present invention generally relates to fasteners and more particularly, to fasteners with guide members and guide member arrangements for use with a fastener to guide corresponding fastener components onto it.

BACKGROUND

Working with common fasteners is not always an easy task, especially in confined workspaces or recessed cavities lacking sufficient clearance or visibility to prevent loss of anything. In many situations, manipulating nuts and washers onto a separate fastener is often tricky when the workspace is out of view; they frequently fall away out of reach or somewhere irretrievable, leaving the user frustrated and without remedy. Other times parts are lost simply because they aren't properly secured during packaging.

Hence, there is a need for an apparatus/fastener, such as a bolt or screw, which employs a method to retain separate joinable parts until they are needed.

There is also a need for a fastener, such as a bolt or screw, which enables the user to guide at least one joinable part onto the fastener without visual clues.

There is also a need for an apparatus for attachment to a fastener, such as a bolt or screw, which enables the user to guide at least one non-joinable part, such as a collar or grommet, onto the fastener or into alignment with the fastener or its mounting hole(s) without visual clues.

There is also a need for a guide wire temporarily or permanently attachable to a fastener, such as a bolt or screw, to guide at least one other part, like a nut or washer, onto it forming at least one new part.

There is a further need for guide wire temporarily or permanently attachable to a fastener, such as a bolt or screw, be removable once those parts have been engaged.

There is a another need for a guide wire, temporarily or permanently attachable to a fastener, such as a bolt or screw, to guide at least one other part, such as a nut or washer, onto it or secure those part(s) to it until needed, and which can be removable once the parts have been engaged.

Additionally, there is a need for a fastener, such as a bolt or screw, which helps to prevent injuries from falling parts.

There is a further need for a fastener, such as a bolt or screw, having a guide ("guide wire" or "member") that is easy to use and inexpensive to manufacture.

Various embodiments may fulfill one or more of the foregoing needs and others.

The foregoing discussion is intended only to illustrate various aspects of the related art in the field of the invention at the time, and should not be taken as a disavowal of claim scope.

SUMMARY

In accordance with at least one form of the present invention, there is provided a guide member assembly for use in connection with a fastener. In at least one form, the guide member assembly comprises an attachment member that has a guide member protruding therefrom. The guide member includes a cross-sectional size that is less than a cross-sectional size of a body portion of the fastener. The guide member further comprises a non-threaded fastener medium for affixing the attachment member to an end of the body portion of the fastener.

In accordance with at least one other general form of the present invention, there is provided a guide member assembly for use in connection with a fastener that has a body portion. In at least one form, the guide member assembly comprises an elastic attachment member that has a cavity therein that is sized to retainingly receive an end of the fastener body portion therein. A guide member protrudes from the attachment member and has a cross-sectional size that is less than a cross-sectional size of the body portion of the fastener.

In accordance with still another form of the present invention, there is provided a guide member assembly for use in connection with a fastener that has a body portion. In connection with at least one form, the guide member assembly comprises an attachment member that has a guide member protruding therefrom. The guide member has a cross-sectional size that is less than a cross-sectional size of a body portion of the fastener. The assembly further includes means for affixing the attachment member to an end of the body portion of the fastener without the use of tools.

In accordance with another form of the present invention, there is provided a fastener that comprises a fastener body portion that has an end. An unthreaded guide member is attached to the end of the body portion without the use of threads. The guide member has a cross-sectional size that is less than a cross-sectional size of a body portion of the fastener.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the various forms of the present invention.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments of the present invention is defined solely by the claims. The features illustrated or described in connection with one exemplary embodiment may be combined with the features of other embodiments. Such modifications and variations are intended to be included within the scope of the present invention.

Figures 1, 2:
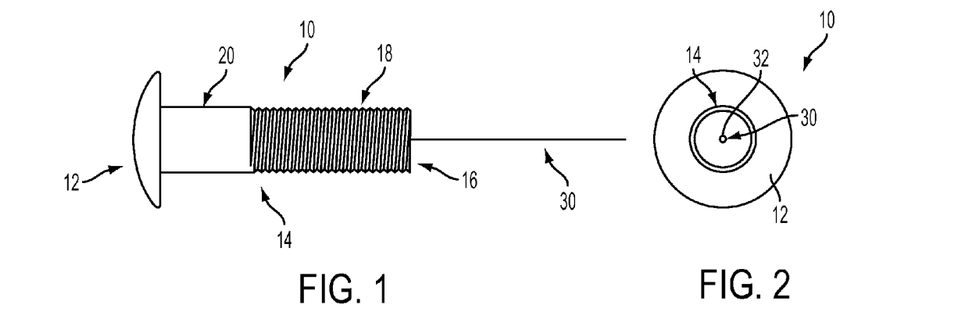
FIG. 1 is a side view of one fastener embodiment.
FIG. 2 is an end view of the fastener embodiment of FIG. 1.

FIGS. 1 and 2 illustrate one exemplary fastener 10 of one embodiment of the present invention. As can be seen in FIG. 1, the fastener 10 has a head portion 12 and a body portion 14 that terminates in a tip 16. The body portion 14 in the illustrated embodiment has a threaded section 18 and an unthreaded shank 20. The threaded section 18 may be configured to threadably engage a nut, tapped hole, etc. In this embodiment, a guide member 30 protrudes from the end of the body portion 14. The guide member 30 may be substantially rigid or substantially flexible (ductile) and comprise, for example, a metal wire or the like that has a cross-sectional size (e.g., diameter) that is less than the cross-sectional size of the body portion 14 to facilitate easy insertion into a corresponding fastener arrangement (e.g., a nut, a tapped hole, etc.).

Referring to FIG. 2, an end of the guide member 30 may be inserted into a hole 32 provided in the end of the body portion 14. The hole 32 may be sized and shaped relative to the guide member 30 to facilitate the establishment of an interference fit therebetween. In some embodiments, an addition fastener medium may be used to further attach the guide member 30 to the body portion 14. In other embodiments, no interference fit may be established and the guide member 30 is essentially coupled to the end of the body portion 14 by a fastening medium. In various embodiments, for example, the guide wire may be integrally formed with a given fastener or be attached or affixed thereto via separate means, whether permanent or otherwise, using adhesives to include glues, tapes or tacky substances, malleable or pliable materials, or solders or welds to facilitate same. In those embodiments wherein the guide member 30 is integrally formed in the end of the body portion 14, the user may break off the guide member 30 from the body portion 14 after the fastener has been installed. In some embodiments, for example, the guide member 30 may be formed with a weakened area that facilitates easy detachment from the body portion 14.

Figure 3:
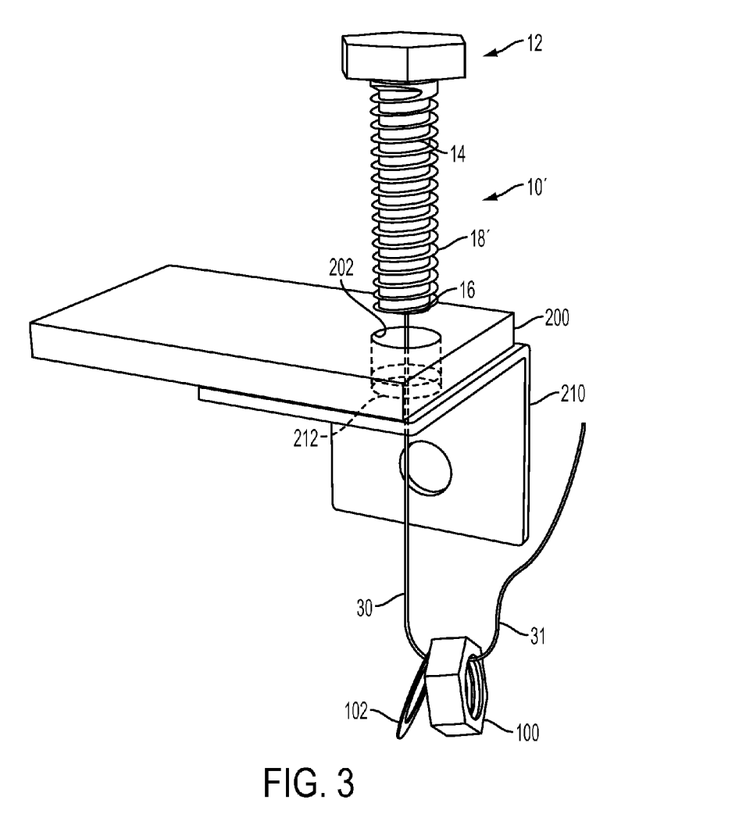
FIG. 3 is a perspective view illustrating one use of a fastener embodiment to fasten two members together.
Figure 4:
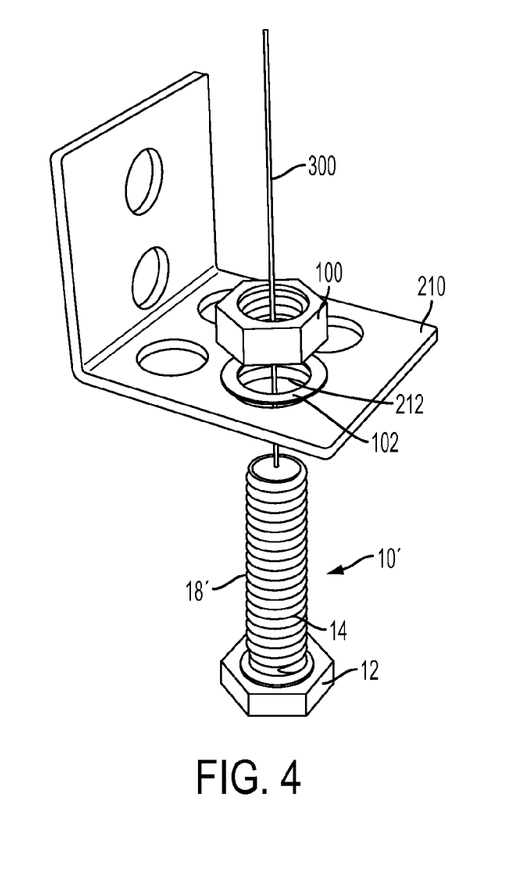
FIG. 4 is an exploded assembly view illustrating attachment of a fastener embodiment to a member.
Figure 5:
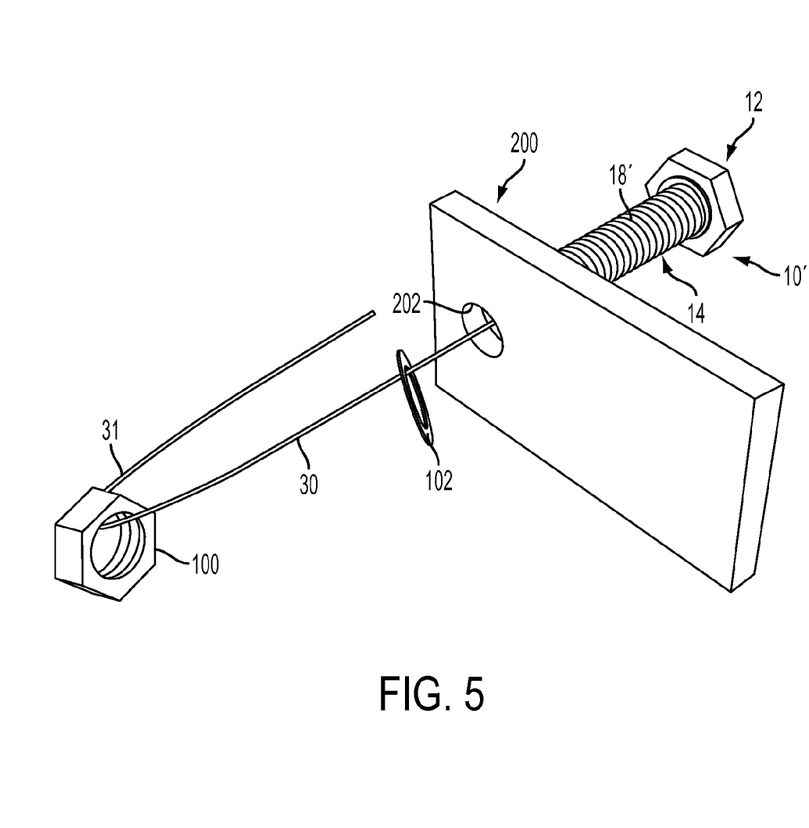
FIG. 5 is a bottom perspective view illustrating attachment of a fastener embodiment to a member.
Figure 6:
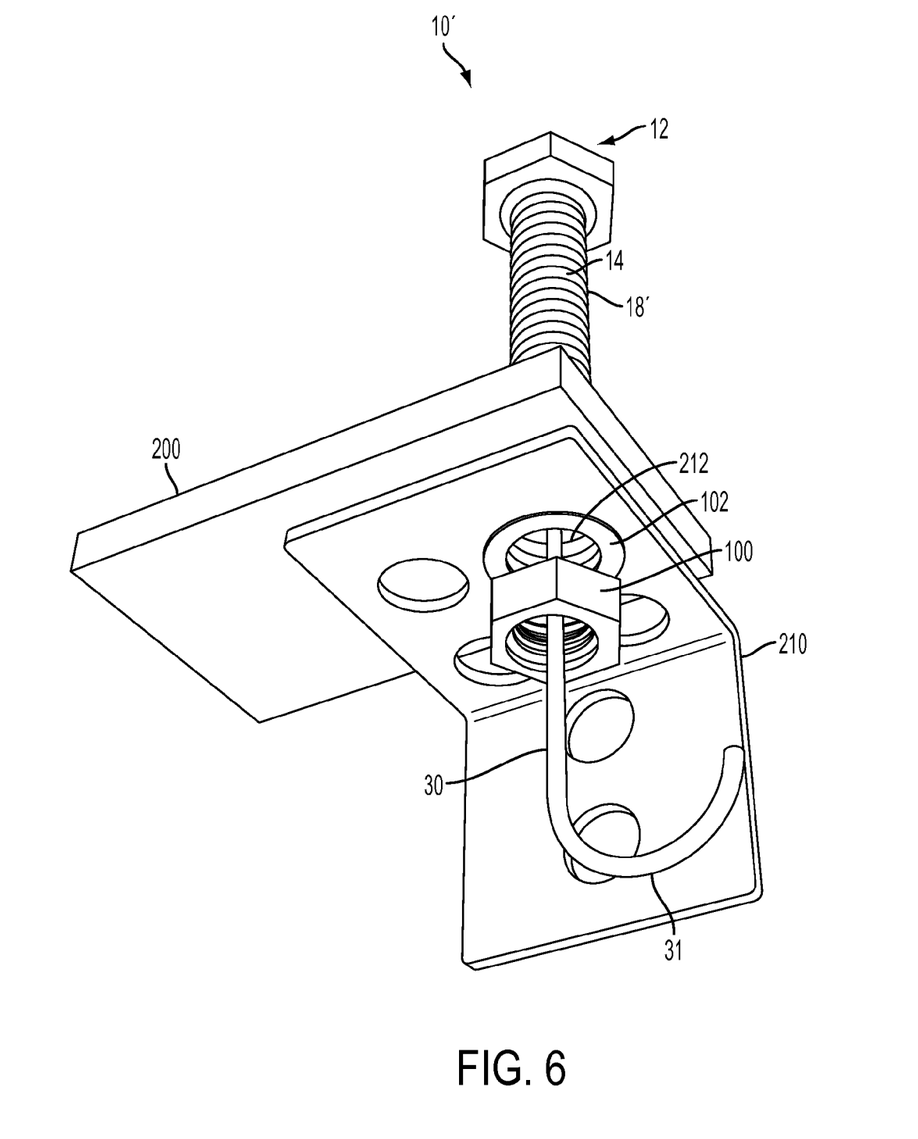
FIG. 6 is a bottom perspective view illustrating use of another fastener embodiment to fasten two members together.
Figure 7:
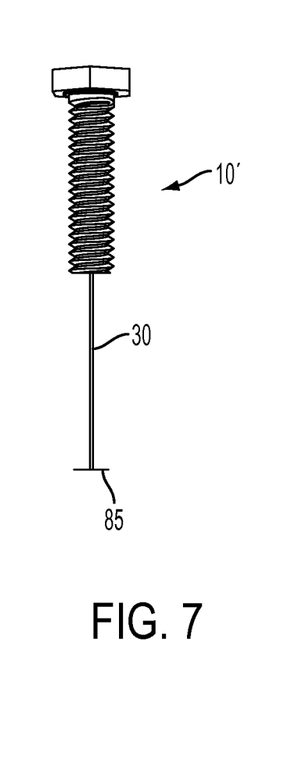
FIG. 7 is a side view of another fastener embodiment.

FIGS. 3-5 are perspective views illustrating exemplary uses of a fastener 10' of another embodiment of the present invention. For example, fastener 10' is substantially similar to fastener 10, except that threads 18' are formed on the entire body portion 14. In the illustrated embodiments, the fastener 10' is being employed to fasten a first member 200 to a second member 210. First member 200 has a fastener hole 202 therein and second member 210 has fastener hole 212 therein. As can be seen in FIG. 3, the guide member 30 has been inserted through the coaxially aligned holes 202 and 212. The end of the guide member 300 may be bent or otherwise formed with a hook-shape to retain a fastener nut 100 and, if desired, a washer (or washers) 102 may be place thereon. Such arrangement prevents the user from inadvertently dropping the nut 100 and/or washer(s) 102 during the assembly process. FIG. 6 is yet another perspective view wherein the fastener 10' is being attached to member 200. In this embodiment, the guide member 30 is substantially rigid and is permanently formed with a hook-shape. FIG. 7 illustrates a fastener 10' that includes a retainer portion 85 that is substantially perpendicular to the axis of the guide member 30 to further assist in retaining, for example, a nut and/or washer(s) on the guide member 30 prior to installation.

Figure 8:
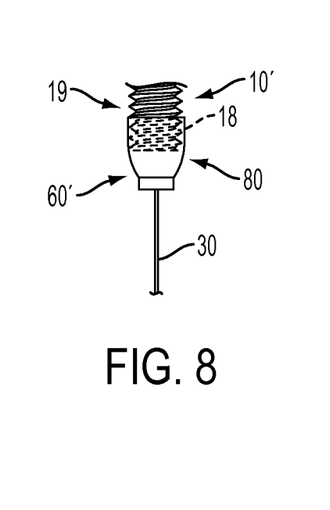
FIG. 8 is a partial side view of a guide member assembly embodiment attached to an end portion of a fastener that has a threaded body portion.
Figure 9:
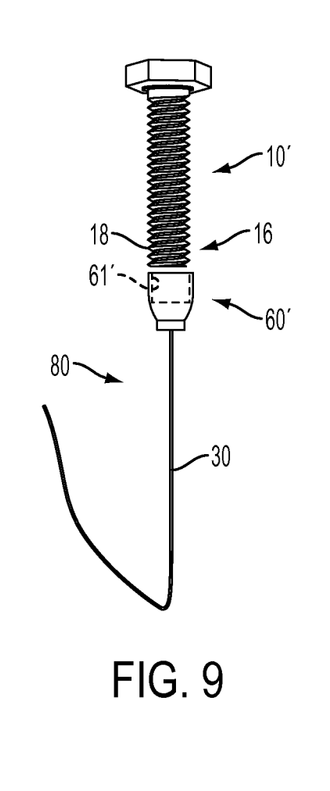
FIG. 9 is an exploded assembly view of the guide member assembly and fastener of FIG. 8.

FIGS. 8 and 9 illustrate use of guide member assembly 80 that includes an attachment member 60' that is formed from flexible, stretchable or elastic material such as, for example, Teflon® material, rubber material or the like that is designed to elastically engage the threaded tip of the fastener 10'. For example, the attachment member 60' may substantially resemble a cup-like configuration that has a cavity 61' therein that is designed to receive the tip 16 of the fastener 10' therein. In one embodiment, the elastic Teflon member 60' is stretched over the threads 18 on the fastener tip 16. A guide member 30 is attached to the attachment member 60' in the various manners herein described. The Teflon attachment member 60' may also serve as a thread-sealing medium as the nut (not shown) is threaded thereon. The guide member 30 may be ductile to enable the user to form a hook on the end thereof. In other embodiments, the guide member 30 may be permanently formed with a J-shape or hook-shape or other advantageous shape for holding related fastener members. As used in this context, the term "permanently formed" means that the guide member is formed with a shape that is not intended to otherwise be altered by the user prior to use or in the field. In still other embodiments, the guide member 30 may be formed with a retainer portion that is substantially perpendicular thereto or arranged on some advantageous angle relative to the guide member 30. In use, after a nut or other threaded element has been threaded onto the attachment member 60' on the fastener 10', the guide member 30 may be detached from (e.g., cut from, pulled out of, snapped off of, etc.) the attachment member 60'.

Figure 10:
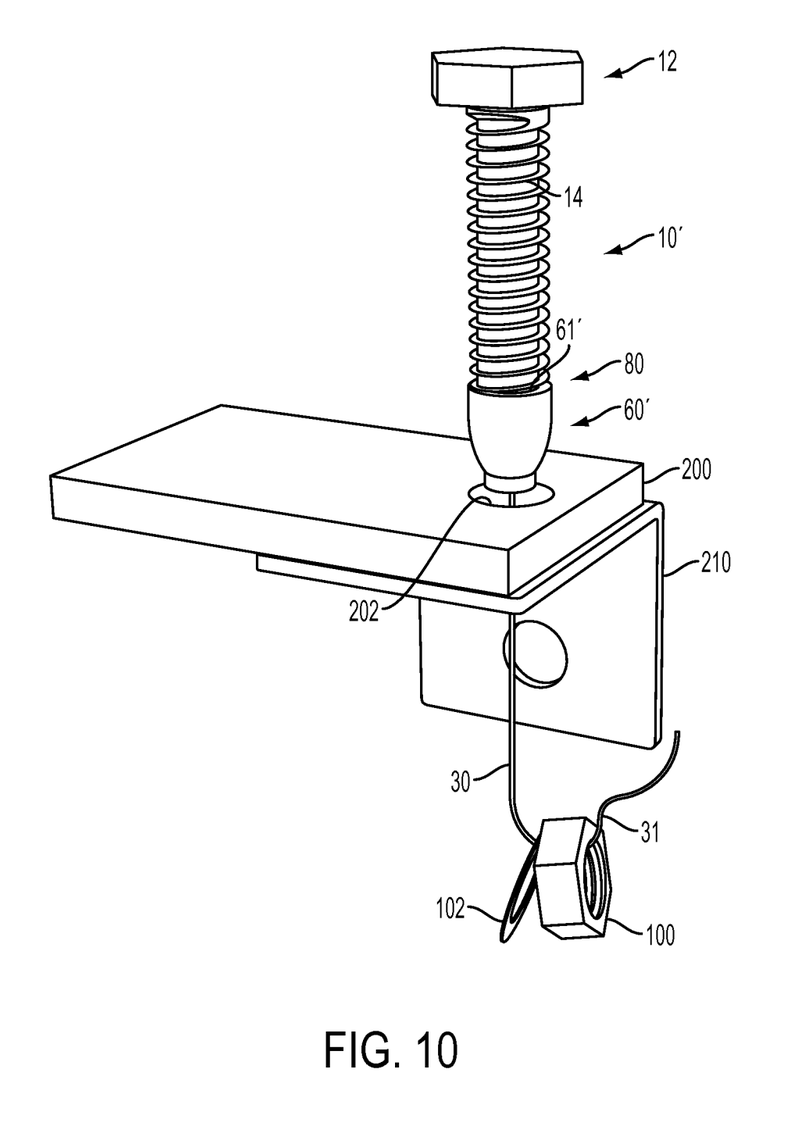
FIG. 10 is a perspective view of the guide member assembly of FIGS. 8 and 9 attached to a fastener being used to couple two members together.

FIG. 10 illustrates use of the guide member assembly 80 on a fastener 10' for fastening a first member 200 to a second member 210. First member 200 has a fastener hole 202 therein and second member 210 has fastener hole 212 therein. As can be seen in those Figures, the guide member 30 has been inserted through the coaxially aligned holes 202 and 212. The end of the guide member 30 may be bent or otherwise formed with a hook-shape to retain a fastener nut 100 and, if desired, a washer (or washers) 102 thereon. Such arrangement prevents the user from inadvertently dropping the nut 100 and/or washer(s) 102 during the assembly process.

Figure 11:
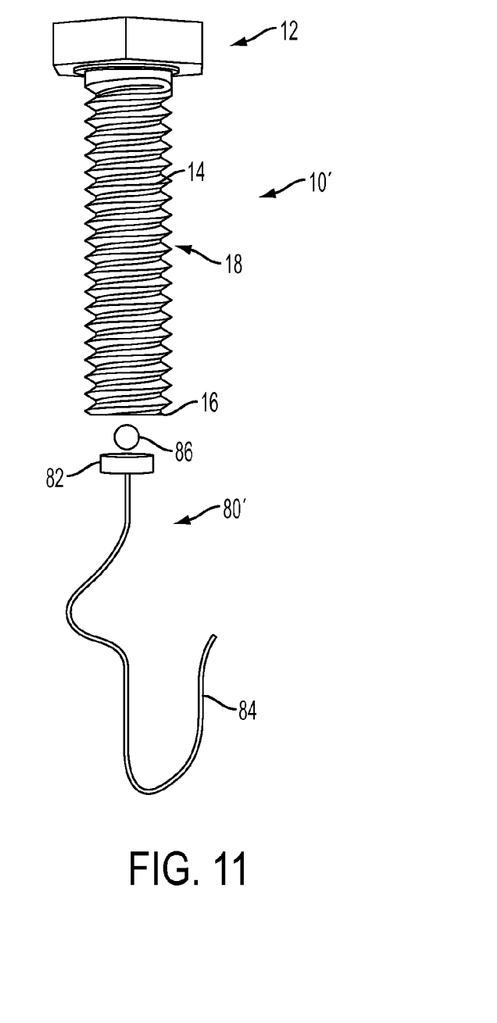
FIG. 11 is an exploded assembly view of another guide member assembly embodiment and a fastener.
Figure 12:
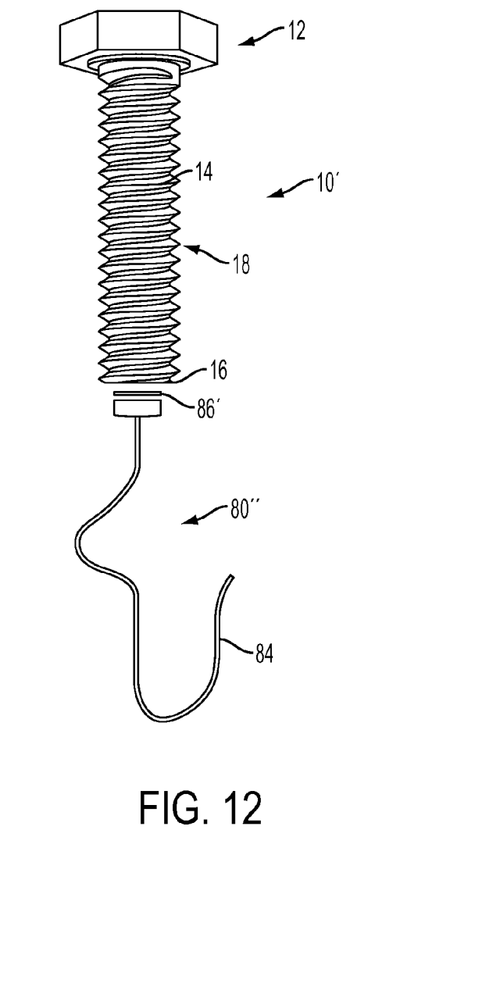
FIG. 12 is an exploded assembly view of another guide member assembly embodiment and a fastener.
Figure 13:
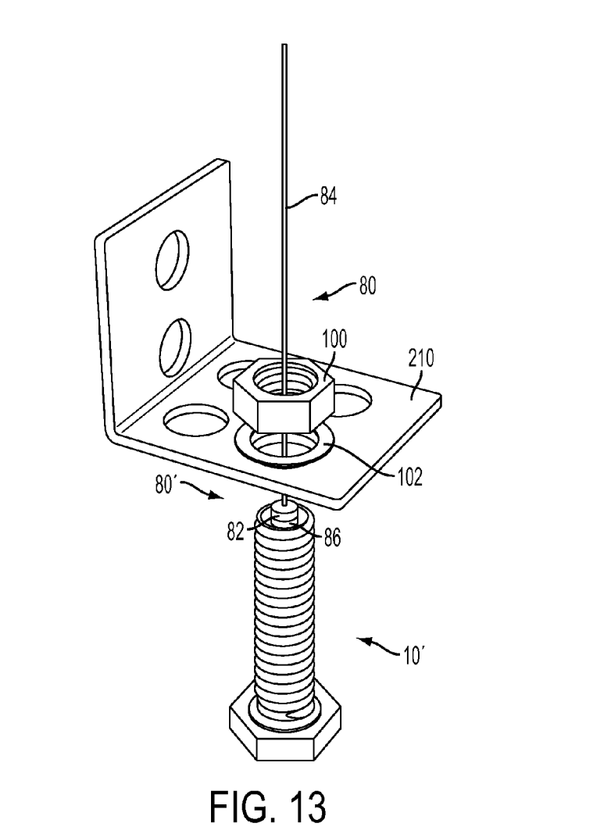
FIG. 13 is a perspective view of the guide member assembly of FIG. 11 attached to a fastener being coupled to a member.
Figure 14:
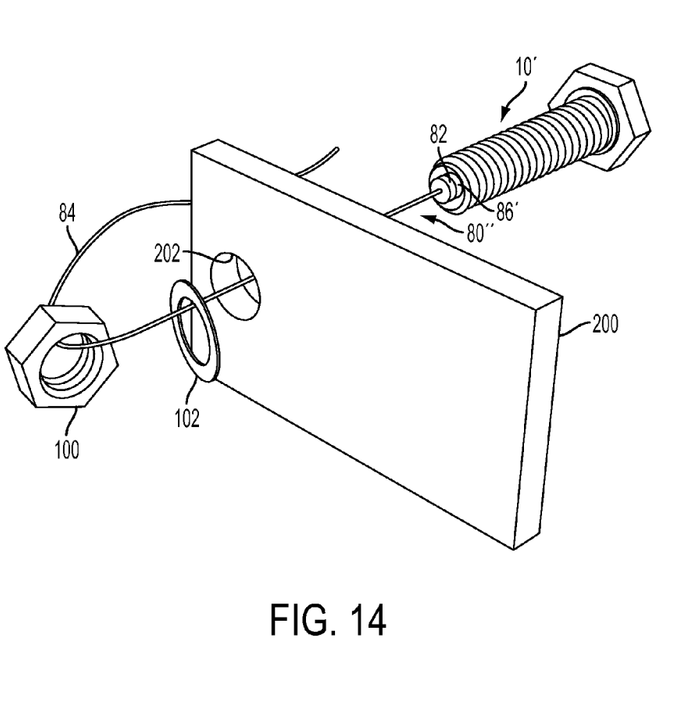
FIG. 14 is a perspective view of the guide member assembly of FIG. 12 attached to a fastener being attached to a member.

FIG. 11 illustrates another guide member assembly 80' that may be used with a conventional fastener 10. The guide member assembly 80' includes an attachment member 82 that has a guide member 84 protruding therefrom. The guide member 84 may comprise, for example, a metal wire or the like. In this embodiment, the guide member assembly 80' is attached to the tip 16 of the body portion 14 of the fastener 10' by a coupler 86 comprising, for example, a breakable globule of adhesive. In use, the user forces the attachment member 82 and coupler 86 into the end of the fastener tip 16 with sufficient force so as to rupture the coupler 86 to thereby cause the adhesive to disperse onto the tip 16. The adhesive may be of a type that temporarily affixes the attachment member 82 to the fastener 10' for use and then permits the user to detach the attachment member 82 from the fastener 10' after the fastener 10' has been installed. Such configuration enables the user to employ the guide member assembly 80' without the need for tools or additional attachment mediums. In other embodiments, the adhesive permanently affixes the attachment member to the fastener tip. FIG. 12 illustrates another guide member assembly 80" that employs an alternative coupler arrangement 86' which may comprise, for example, double-sided tape or the like. FIGS. 13 and 14 illustrate exemplary uses of the guide member assemblies 80', 80".

Figure 15:
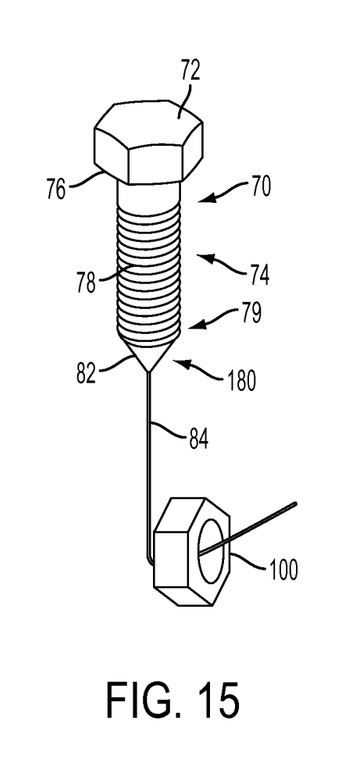
FIG. 15 is a perspective view of a guide member assembly embodiment attached to a fastener and supporting a fastener component such as a nut prior to use.
Figure 16:
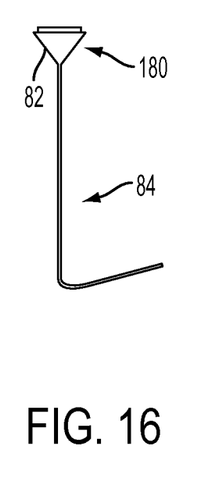
FIG. 16 is a perspective view of the guide member assembly embodiment depicted in FIG. 15.
Figure 17:
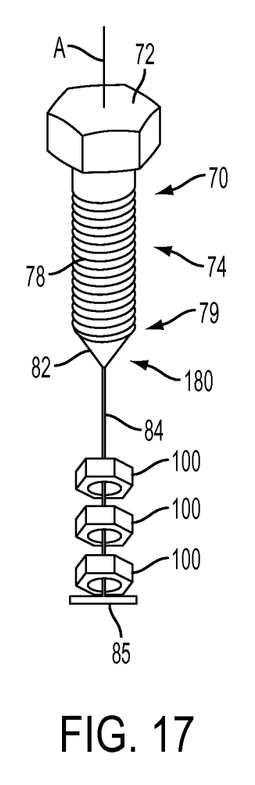
FIG. 17 is a perspective view of another guide member assembly coupled to a fastener and supporting a plurality of fastener components (e.g., nuts) thereon prior to use.

FIGS. 15-17 illustrate an alternative guide member assembly 180. In this embodiment, for example, the attachment member 82 has a conical shape and the guide member 84 is configured to protrude from its pointed tip. The attachment member 82 may be attached to the end 79 of the body portion 74 by the couplers 86, 86' as described above or it may be attached by adhesive, solder, welding, tape, shrink tubing, etc. In the embodiment depicted in FIG. 17, a retainer 85 is formed on the end of the guide member 84 to retain the nuts 100 thereon. Those of ordinary skill in the art will further appreciate that the guide member assemblies 80, 80', 80", 180 may be supplied separately from their corresponding fasteners.

Figure 18:
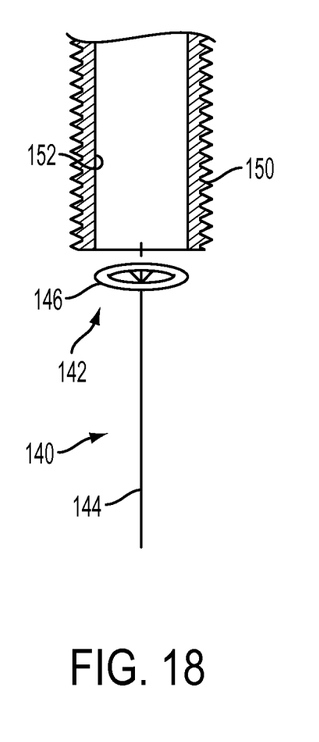
FIG. 18 is a partial exploded assembly view of a fastener arrangement and another guide member assembly embodiment of the present invention.

An alternative guide member assembly 140 is depicted in FIG. 18. This guide member assembly 140 also comprises a stand-alone unit that is not affixed or attached to a specific fastener, such as a bolt or screw. The guide member assembly 140 includes an attachment member 142 that has a guide member 144 protruding therefrom. The attachment member 142 to which the guide member 144 is attached, has a barb or ring 146 on one end that is intended to hold the attachment member 142 in place during the installation process. For example, the guide member 142 may be inserted into a hollow opening 152 of an externally threaded tube 150, such as what is often found on the distal end of a common faucet assembly. The guide member 144 may be configured to retain a variety of different components, such as, for example, when attached to a fastener, which may comprise, for example, a threaded flange, rubber gasket or a non-joinable part, such as a collar or grommet, etc. The guide member 144 thereby enables the user to guide at least one joinable part onto the tube 150 or into alignment with the tube 150 or its mounting hole(s), without visual clues. The size and shape of the attachment member 142 may be designed to insure that sufficient outward pressure will be applied to the inner surface of the tube 150 once inserted without impeding removal of the apparatus if so desired. This version may be used, for example, to guide a threaded flange ring of a faucet assembly backing plate onto its threaded tube extending downward through mounting holes in the sink, joining the two parts, securing said flange accordingly by rotating it until tight.

Those of ordinary skill in the art will understand that the various embodiments of the present invention disclosed herein and their respective equivalents may be advantageously employed in connection with a variety of different fastener arrangements. For example, while each of the fasteners disclosed in the accompanying Figures have a head portion, various fastener embodiments of the present invention may not include a head portion. Similarly, while each of the fasteners depicted in the Figures all have a threaded portion, various embodiments of the present invention may lack such threads. For example, the unique and novel arrangements of various embodiments of the present invention may be employed in connection with various "fastener" forms such as pins, rivets, rods, brackets, mounting plates, etc. that are adapted to be inserted into a hole, opening, passage, etc. or corresponding element for fastening purposes wherein the guide member assembly may be employed to advantageously guide the member into the hole, opening, passage or accompanying fastening element or temporarily couple the related fastening elements thereto prior to installation. The fasteners may also be substantially hollow and have internal threaded portions and/or external threaded portions or have no threads at all. Some fasteners may be substantially rigid and be fabricated from, for example, a metal (e.g., various types of steel, titanium, aluminum, etc.) and other fasteners may be substantially flexible and be fabricated from, for example, rubber or other various polymer materials.

The various guide members disclosed herein may be substantially rigid or substantially flexible. The rigid guide members may be integrally formed with the fastener body or they may be otherwise permanently or temporarily attached thereto. In at least some embodiments, the guide member may have a diameter or cross-sectional shape that is substantially smaller that the diameter or cross-sectional shape of the body of the fastener or the portion of the fastener configured for fastening purposes. For example, the diameter or cross-sectional shape of the guide member may be at least approximately less than one fifth ($\frac{1}{5}$) the diameter of the body portion. Other cross-sectional size/shape differences may also be employed.

While various guide members of the present invention may be employed to temporarily fasten a fastener to its corresponding fastener element prior to their intended use, various guide members are not intended to fasten the fastener to anything when the fastener is being used for its intended purpose. Guide members of various embodiments of the present invention protrude out from the distal end of the body portion of the fastener and may be distinguished from those fastener arrangements that simply have a slightly necked down or reduced portion on the end of the body member which may be formed during the manufacturing process. In various embodiments, for example, the guide member may protrude beyond the end of the body portion a distance that it is at least approximately one half ($\frac{1}{2}$) the length of the body portion. Of course, the guide member may be provided in a variety of other lengths. For example, the guide member may protrude a distance that is less than the length of the body portion or it may protrude a distance that is significantly longer than the length of the body portion.

The various guide members disclosed herein may be fabricated from an assortment of materials like metal, polymer, etc. and have various strengths, thicknesses or weights that can be made into a variety of lengths, shapes or sizes. The guide members may be flexible or rigid, malleable or deformable. The guide members may be temporarily attached to the fastener body by solder, tape, shrink-wrap, adhesive, etc. The guide member assemblies may be sold separately from their corresponding fasteners.

Various guide member assemblies may be configured for use with a variety of different sizes, shapes and fastener configurations. In addition, for example, the guide members may be formed with a movable locking closure feature located at its distal end to retain the nuts, washers, etc. on the guide member. For example, such closure feature may resemble a latch arrangement of the type employed on carabiners or the like. However, other forms of movable locking features could also be employed on the distal end of the guide member. The various guide member assemblies of the present invention may be sold in kit form, with and without their corresponding fasteners.

The invention which is intended to be protected is not to be construed as limited to the particular embodiments disclosed. The embodiments are therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. A guide member assembly adapted for use in connection with a fastener having a fastener body portion that includes threads thereon, the guide member assembly comprising:
   a stretchable attachment member adapted to be stretched over the threads on an end of the fastener body portion in retaining engagement therewith; and
   an elongate wire member protruding from the stretchable attachment member such that when the stretchable attachment member has been retainingly stretched over the end of the fastener body portion, no portion of the elongate wire member protrudes laterally beyond an outer perimeter of the fastener body portion.

2. The guide member assembly of claim 1 wherein said stretchable attachment member is fabricated from a thread sealing medium.

3. The guide member assembly of claim 2 wherein the thread sealing medium comprises polytetrafluoroethylene material.

4. The guide member assembly of claim 1 wherein the elongate wire member is permanently formed in a desired shape.

5. The guide member assembly of claim 4 wherein the desired shape comprises a hook-shape.

6. The guide member assembly of claim 1 wherein the elongate wire member is substantially flexible.

7. The guide member assembly of claim 1 wherein said elongate wire member comprises a ductile wire.

8. The guide member assembly of claim 1 wherein the elongate wire member protrudes beyond the end of the fastener body a distance that is at least one half of a length of the fastener body.

9. A method of using a fastener, comprising:
   providing a fastener having a fastener body portion that includes threads thereon;
   providing a guide member assembly of claim 1;
   attaching the attachment member of the guide member assembly to the end of the fastener body portion; and
   inserting an end of the elongate wire member through a hole in a component.

10. The method of claim 9 wherein the component comprises a nut configured to threadably engage the threads on the fastener.

11. The method of claim 10 further comprising bending the end of the elongate wire member extending through the hole in the nut such that the nut is hookingly retained on the elongate wire member.

12. A kit, comprising:
   at least one fastener comprising a fastener body portion that includes threads thereon; and
   a guide member assembly of claim 1 corresponding to each said fastener.

13. The kit of claim 12 further comprising at least one threaded nut corresponding to each said fastener.

* * * * *